US008990086B2

(12) United States Patent
Jeong et al.

(10) Patent No.: US 8,990,086 B2
(45) Date of Patent: Mar. 24, 2015

(54) RECOGNITION CONFIDENCE MEASURING BY LEXICAL DISTANCE BETWEEN CANDIDATES

(75) Inventors: Sang-Bae Jeong, Suwon-si (KR); Nam Hoon Kim, Suwon-si (KR); Ick Sang Han, Yongin-si (KR); In Jeong Choi, Hwaseong-si (KR); Gil Jin Jang, Suwon-si (KR); Jae-Hoon Jeong, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1911 days.

(21) Appl. No.: 11/495,562

(22) Filed: Jul. 31, 2006

(65) Prior Publication Data

US 2007/0185713 A1    Aug. 9, 2007

(30) Foreign Application Priority Data

Feb. 9, 2006   (KR) .......................... 10-2006-0012528

(51) Int. Cl.
*G10L 15/00*   (2013.01)
*G10L 15/10*   (2006.01)
(Continued)

(52) U.S. Cl.
CPC ............... *G10L 15/08* (2013.01); *G10L 15/187* (2013.01)
USPC ........... 704/251; 704/252; 704/254; 704/238; 704/239; 704/234; 704/255

(58) Field of Classification Search
CPC ............ G10L 15/22–15/32; G10L 2015/0631; G10L 15/08; G10L 15/142; G10L 15/19; G10L 15/187; G10L 15/063; G10L 15/265; G10L 15/30; G10L 2015/088

USPC .............. 704/251, 233, 231, 256, 256.1, 252, 704/200, 234, 238–240, 270, 270.1, 275
See application file for complete search history.

(56) References Cited

U.S. PATENT DOCUMENTS 5,566,272 A * 10/1996 Brems et al. .................. 704/231
6,029,124 A *  2/2000 Gillick et al. ................. 704/200
(Continued)

FOREIGN PATENT DOCUMENTS

JP       2005-148342      6/2005
KR    10-2005-0076697      7/2005
WO    WO2005122144    * 12/2005 .............. G10L 15/22

OTHER PUBLICATIONS

Huang et al. "Unified stochastic engine (USE) for speech recognition", Acoustics, Speech, and Signal Processing, Apr. 27-30, 1993. ICASSP-93., 1993 IEEE International Conference, vol. 2, pp. 636-639.*

(Continued)

*Primary Examiner* — Abdelali Serrou
(74) *Attorney, Agent, or Firm* — Staas & Halsey LLP

(57) ABSTRACT

A recognition confidence measurement method, medium and system which can more accurately determine whether an input speech signal is an in-vocabulary, by extracting an optimum number of candidates that match a phone string extracted from the input speech signal and estimating a lexical distance between the extracted candidates is provided. A recognition confidence measurement method includes: extracting a phoneme string from a feature vector of an input speech signal; extracting candidates by matching the extracted phoneme string and phoneme strings of vocabularies registered in a predetermined dictionary and; estimating a lexical distance between the extracted candidates; and determining whether the input speech signal is an in-vocabulary, based on the lexical distance.

17 Claims, 7 Drawing Sheets

(51) Int. Cl.
*G10L 15/12* (2006.01)
*G10L 15/08* (2006.01)
*G10L 15/187* (2013.01)

(56) References Cited

U.S. PATENT DOCUMENTS

| | | | |
|---|---|---|---|
| 6,073,095 A * | 6/2000 | Dharanipragada et al. ... | 704/242 |
| 6,185,530 B1 * | 2/2001 | Ittycheriah et al. ........... | 704/255 |
| 6,205,428 B1 * | 3/2001 | Brown et al. ................. | 704/270 |
| 6,275,801 B1 * | 8/2001 | Novak et al. ................. | 704/252 |
| 6,594,629 B1 * | 7/2003 | Basu et al. ................... | 704/251 |
| 6,732,074 B1 * | 5/2004 | Kuroda ........................ | 704/244 |
| 6,763,331 B2 * | 7/2004 | Wakita et al. ................. | 704/251 |
| 6,912,498 B2 | 6/2005 | Stevens et al. | |
| 6,912,499 B1 * | 6/2005 | Sabourin et al. ............. | 704/243 |
| 6,996,527 B2 * | 2/2006 | Boman et al. ................ | 704/239 |
| 7,035,802 B1 * | 4/2006 | Rigazio et al. ............... | 704/256 |
| 7,181,398 B2 * | 2/2007 | Thong et al. ................. | 704/254 |
| 7,299,179 B2 * | 11/2007 | Block et al. .................. | 704/254 |
| 7,310,600 B1 * | 12/2007 | Garner et al. ................ | 704/234 |
| 7,529,668 B2 * | 5/2009 | Abrego et al. ............... | 704/244 |
| 7,657,430 B2 * | 2/2010 | Ogawa ......................... | 704/243 |
| 7,752,044 B2 * | 7/2010 | Lam et al. .................... | 704/239 |
| 7,813,928 B2 * | 10/2010 | Okimoto et al. ............. | 704/251 |
| 7,844,459 B2 * | 11/2010 | Budde et al. ................. | 704/254 |
| 7,917,363 B2 * | 3/2011 | Starkie ......................... | 704/251 |
| 2001/0020226 A1 * | 9/2001 | Minamino et al. ............ | 704/251 |
| 2002/0120447 A1 * | 8/2002 | Charlesworth et al. ....... | 704/254 |
| 2003/0182120 A1 * | 9/2003 | Hwang ......................... | 704/251 |
| 2003/0187643 A1 | 10/2003 | Van Thong et al. | |
| 2003/0204398 A1 * | 10/2003 | Haverinen et al. ............ | 704/233 |
| 2004/0030552 A1 * | 2/2004 | Omote et al. ................. | 704/245 |
| 2004/0117181 A1 * | 6/2004 | Morii et al. ................... | 704/234 |
| 2004/0153321 A1 * | 8/2004 | Chung et al. ................. | 704/251 |
| 2004/0210443 A1 * | 10/2004 | Kuhn et al. ................... | 704/276 |
| 2005/0010412 A1 | 1/2005 | Aronowitz | |
| 2005/0180547 A1 * | 8/2005 | Pascovici .................... | 379/88.01 |
| 2007/0033044 A1 * | 2/2007 | Yao ............................. | 704/256.3 |
| 2007/0038450 A1 * | 2/2007 | Josifovski ..................... | 704/255 |
| 2008/0167872 A1 * | 7/2008 | Okimoto et al. ............. | 704/251 |
| 2008/0177542 A1 * | 7/2008 | Yamamoto .................... | 704/253 |

OTHER PUBLICATIONS

Srinivasan et al Phonetic confusion matrix based spoken document retrieval), Proceeding SIGIR '00 Proceedings of the 23rd annual international ACM SIGIR conference on Research and development in information retrieval, 2000, pp. 81-87.*

Thambiratnam et al. (http://research.microsoft.com/pubs/130835/icassp05.pdf), 2005, pp. 1-4.*

T. Jitsuhiro et al., "Rejection by Confidence Measure Based on Likelihood Difference Between Competing Phonemes", Technical Report of IEICE, SP 97-76, pp. 1-7 (1997).*

M. Weintraub et al., "Neural-network based measures of confidence for word recognition," IEEE Proc. ICASSP '97, vol. 2, pp. 887-890, 1997.*

Kobayashi, Y., et al., Matching Algorithms Between a Phonetic Lattice and Two Types of Templates—Lattice and Graph, Dept. of Computer Science, Kyoto Institute of Technology, IEEE (1985), CH2118-8/85/0000-1597, pp. 1597-1600.*

Zobel J., et al, "Phonetic String Matching, Lessons From Information Retrieval", Sigir Forum, Association for Computing Machinery, New York, US, 1996, pp. 166-172, XP000870222.*

* cited by examiner i)

<ESTIMATION OF PHONEME CONFUSION MATRIX 1> ii)

FIG. 5 i)
<ESTIMATION OF PHONEME CONFUSION MATRIX 2>

ESTIMATE CONTINUOUS HMM OR SEMI-CONTINUOUS HMM USING TRAINING DB — S510

ESTIMATE DISTANCE OF PHONEME-BY-PHONEME ACCORDING TO ESTIMATED HMM PROPERTY — S520 ii)
S520

IN CASE OF CONTINUOUS HMM, UTILIZE BHATTACHARYA DISTANCE — S522 iii)
S520

IN CASE OF SEMI-CONTINUOUS HMM, ESTIMATE AMOUNT OF INFORMATION LOSS — S524

RECOGNITION CONFIDENCE MEASURING BY LEXICAL DISTANCE BETWEEN CANDIDATES

CROSS-REFERENCE TO RELATED APPLICATIONS

This application claims the benefit of Korean Patent Application No. 10-2006-0012528, filed on Feb. 9, 2006, in the Korean Intellectual Property Office, the disclosure of which is incorporated herein by reference.

BACKGROUND OF THE INVENTION

1. Field of the Invention

The present invention relates to a recognition confidence measurement method, medium, and system which can determine whether an input speech signal is an in-vocabulary according to an estimation of a lexical distance between candidates.

2. Description of the Related Art

Generally, in a confidence measurement method, a rejection due to recognition error associated with rejection of an out-of-vocabulary is handled with high priority so as to improve convenience with respect to a speech recognizer. To determine such a rejection due to a recognition error, a process of extracting a predetermined number of candidates which are determined to be similar to an input speech signal is required.

FIG. 1 is a diagram illustrating an example of extracting a candidate in a speech recognition system according to a conventional art.

As shown in FIG. 1, the conventional speech recognition method detects feature information from an input speech signal and extracts candidates using the detected feature information and acoustic knowledge. Namely, the conventional speech recognition method replaces a feature vector string, which is extracted from an input speech signal, with a lexical tree. Also, the conventional speech recognition method extracts a larger number of candidates which are determined to be adjacent to the input speech signal, through a phoneme comparison with all vocabularies in a lexical search network.

In the conventional confidence measurement method, since a lexical area to be searched is extremely wide, hardware resources may be needlessly consumed. Also, in the conventional speech recognition method, a value which is extracted per each unit time domain of a feature vector is utilized to determine a candidate. Accordingly, a speech recognition speed is slow, which is not suitable for embedded, large-capacity high speed speech recognition.

When a candidate can be extracted using only a pronunciation string, not constructing a vocabulary search network in the structure of a conventional lexical tree, consumption of hardware resources may be reduced. Also, when a candidate is detected based on a pronunciation string of a speech signal, rapid speech recognition may be possible.

Accordingly, a new confidence measurement model which can improve user convenience and also rapidly recognize a speech by calculating a similarity between a pronunciation string of a speech and a pronunciation string of a vocabulary for recognition and extracting a minimum number of candidates is needed.

SUMMARY OF THE INVENTION

Additional aspects, features, and/or advantages of the present invention will be set forth in part in the description which follows and, in part, will be apparent from the description, or may be learned by practice of the invention.

An aspect of the present invention provides a recognition confidence measurement method and system which can extract a candidate for speech recognition by using a phoneme string that is detected from a feature vector of an input speech signal.

An aspect of the present invention also provides a recognition confidence measurement method and system which can provide a minimum number of candidates and improve user convenience by extracting a phoneme string of a vocabulary that has an optimum lexical distance from a phoneme string of a speech signal by using a phoneme confusion matrix.

An aspect of the present invention also provides a recognition confidence measurement method and system which can more clearly determine whether an input speech signal is an in-vocabulary and perform a rejection due to a recognition error by estimating a lexical distance between candidates.

According to an aspect of the present invention, there is provided a recognition confidence measurement method including: extracting a phoneme string from a feature vector of an input speech signal; extracting candidates by matching the extracted phoneme string and phoneme strings of vocabularies registered in a predetermined dictionary; estimating a lexical distance between the extracted candidates; and determining whether the input speech signal is an in-vocabulary, based on the lexical distance.

According to an aspect of the present invention, there is provided a computer readable storage medium storing a program for implementing a recognition confidence measurement method including extracting a phoneme string from a feature vector of an input speech signal; extracting candidates by matching the extracted phoneme string and phoneme strings of vocabularies registered in a predetermined dictionary; and; estimating a lexical distance between the extracted candidates; and determining whether the input speech signal is an in-vocabulary, based on the lexical distance.

According to another aspect of the present invention, there is provided a recognition confidence measurement system including: a phoneme string extraction unit extracting a phoneme string from a feature vector of an input speech signal; a candidate extraction unit and extracting candidates by matching the extracted phoneme string and phoneme strings of vocabularies registered in a predetermined dictionary; a distance estimation unit estimating a lexical distance between the extracted candidates; and a registration determination unit determining whether the input speech signal is an in-vocabulary, based on the lexical distance.

In another aspect of the present invention, there is provided a recognition confidence measurement method including: extracting candidates by matching a phoneme string of a speech signal and phoneme strings of vocabularies registered in a predetermined dictionary; estimating a lexical distance between the extracted candidates; and determining whether the speech signal is an in-vocabulary, based on the lexical distance.

In another aspect of the present invention, there is also provided a medium including computer readable instructions implementing methods of the present invention

BRIEF DESCRIPTION OF THE DRAWINGS

These and/or other aspects, features, and advantages of the present invention will become apparent and more readily appreciated from the following detailed description, taken in conjunction with the accompanying drawings of which:

FIGS. 4 and 5 are flowcharts illustrating an example of estimating a phoneme confusion matrix according to an exemplary embodiment of the present invention;

DETAILED DESCRIPTION OF THE PREFERRED EMBODIMENTS

Figure 1:
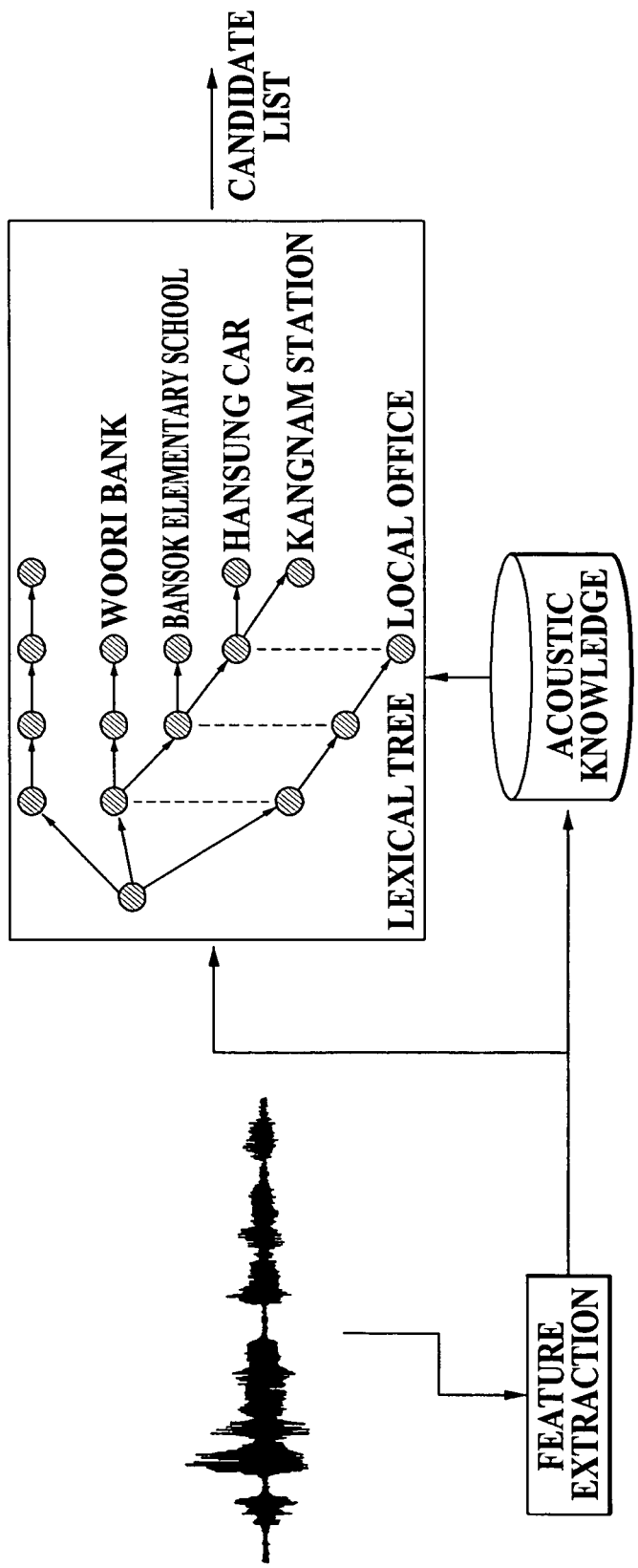
FIG. 1 illustrates an example of extracting a candidate in a confidence measurement system according to a conventional art.

Reference will now be made in detail to exemplary embodiments of the present invention, examples of which are illustrated in the accompanying drawings, wherein like reference numerals refer to the like elements throughout. Exemplary embodiments are described below in order to explain the present invention by referring to the figures.

Figure 2:
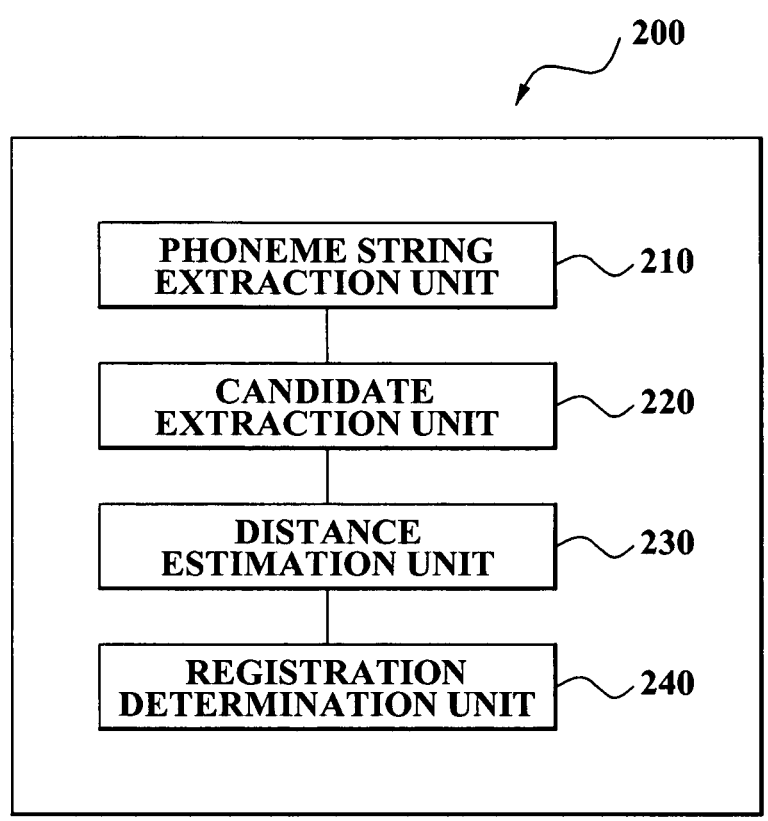
FIG. 2 is a configuration diagram illustrating a recognition confidence measurement system according to an exemplary embodiment of the present invention.

FIG. 2 is a configuration diagram illustrating a recognition confidence measurement system according to an exemplary embodiment of the present invention.

A recognition confidence measurement system 200 according to the present exemplary embodiment functions to search for an optimum number of candidates using a phoneme string that is extracted from an input speech signal and determine the speech signal as an in-vocabulary or an out-of-vocabulary through estimation of the lexical distance between the found candidates. Through the process described above, the recognition confidence measurement system 200 may perform a rejection due to a recognition error with respect to a speech signal, which is determined as an out-of-vocabulary, at a low error rate. Also, the recognition confidence measurement system 200 may reduce a number of candidates to be provided for a user and improve user convenience.

The recognition confidence measurement system 200 according to the present exemplary embodiment may include a phoneme string extraction unit 210, a candidate extraction unit 220, a distance estimation unit 230 and a registration determination unit 240.

The phoneme string extraction unit 210 extracts a phoneme string from a feature vector of an input speech signal. Namely, the phoneme string extraction unit 210 functions to detect a feature vector including feature information of a speech signal, and extract a phoneme string constituting the speech signal by utilizing the detected feature vector.

As an example, a method of the phoneme string extraction unit 210 detecting a feature vector from an input speech signal will be described with reference to FIG. 3.

Figure 3:
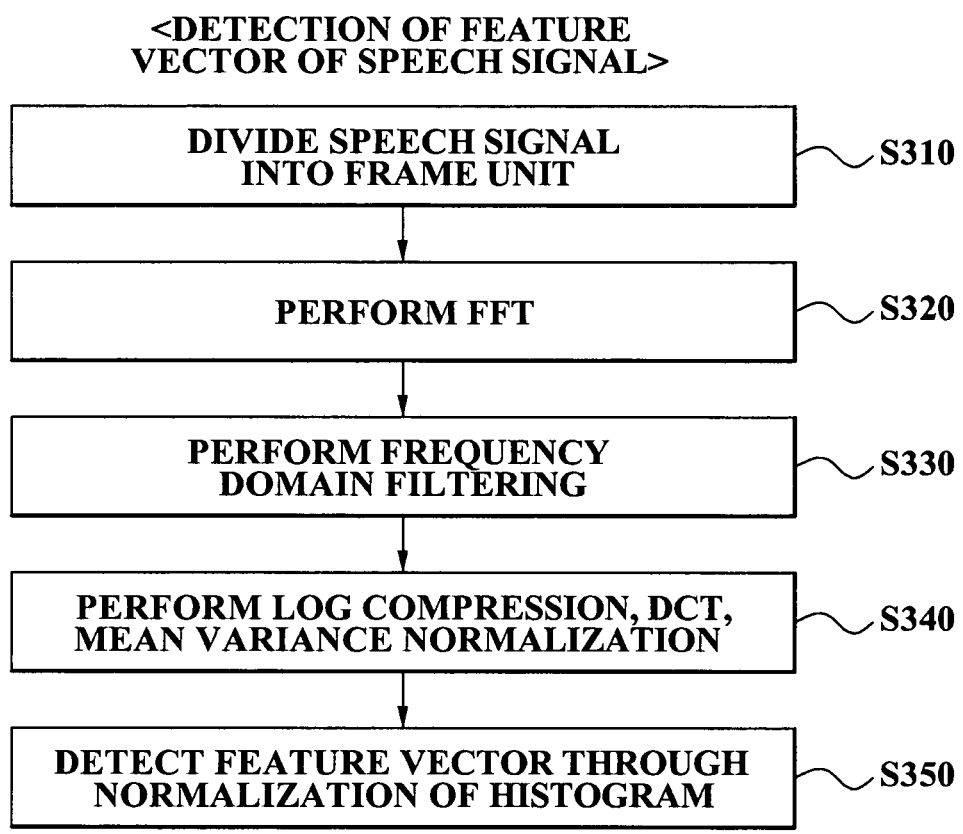
FIG. 3 is a flowchart illustrating a method of detecting a feature vector from an input speech signal by a phoneme string extraction unit according to an exemplary embodiment of the present invention.

FIG. 3 is a flowchart illustrating a method of detecting a feature vector from an input speech signal by a phoneme string extraction unit according to an exemplary embodiment of the present invention.

Referring to FIG. 3, in operation S310, the phoneme string extraction unit 210 divides an input speech signal into predetermined frame units, so as to extract a feature vector of a speech signal.

In operation S320, the phoneme string extraction unit 210 performs a fast Fourier transform (FFT) with respect to each speech signal divided into the frame units, so as to analyze the speech signal in a frequency domain.

In operation S330, the phoneme string extraction unit 210 imitates acoustic ciliated cell signal processing and performs frequency domain filtering with respect to the fast Fourier transformed speech signal.

In operation S340, the phoneme string extraction unit 210 performs logarithmic compression to reduce a dynamic range of the filtered speech signal. Also, the phoneme string extraction unit 210 performs a discrete cosine transform (DCT) to remove a correlation between signals in each band, and also performs mean variance normalization so that signals in the each band can have a zero mean and unit variance.

In operation S350, the phoneme string extraction unit 210 detects a feature vector of an input speech signal through normalization of a histogram. Namely, in operation S350, the phoneme string extraction unit 210 normalizes a histogram so that statistical characteristics of the speech signal may be similar to a model vector. As an example, the phoneme string extraction unit 210 may perform a static histogram normalization, a delta histogram normalization and an acceleration histogram normalization with respect to the speech signal processed through operations S310 through S340, and obtain a 13th order static coefficient, a 13th order delta coefficient and a 13th order acceleration coefficient. Through this process, the phoneme string extraction unit 210 may detect a 39th order cepstrum with respect to the input speech signal.

The detected 39th order feature vector may be utilized for extracting a phoneme string which is most similar to the input speech signal.

Namely, the phoneme string extraction unit 210 extracts an optimum phoneme string according to each language from the detected feature vector, by using a predetermined phoneme grammar for the each language. As an example, the phoneme string extraction unit 210 may recognize an optimum character, e.g. /a/, from alphabets by changing the detected feature vector into a scalar value and analyzing a 39 order cepstrum vector string. Also, when a combination rule of an initial sound/medial sound/final sound of the Korean alphabet is stored in a predetermined phoneme grammar, the phoneme string extraction unit 210 may recognize the detected feature vector as a predetermined Korean consonant/vowel in consideration of linguistic characteristics of the Korean alphabet. Through the process described above, in the case of the Korean alphabet, the phoneme string extraction unit 210 may extract around 45 phoneme strings.

As another example of extracting a phoneme string, the phoneme string extraction unit 210 may extract a phoneme string by using an acoustic Hidden Markov Model (HMM) that has a comparatively high phoneme recognition rate. The acoustic HMM is a technique of modeling a phoneme and utilizes a method of combining input phonemes into a predetermined speech recognition engine and phonemes maintained in a database of the speech recognition engine and thus, making a word and a sentence. In particular, in the present exemplary embodiment, the acoustic HMM utilizes a triphoneme so as to increase a phoneme recognition rate. Also, since an insertion frequently occurs when modeling a long vowel, the acoustic HMM assigns a penalty to correct the modeling.

Namely, the phoneme string extraction unit 210 extracts a predetermined length of a phoneme string by using the feature vector that is detected from the input speech signal.

The candidate extraction unit 220 extracts candidates by matching the extracted phoneme string and phoneme strings of vocabularies registered in a predetermined dictionary. Namely, the candidate extraction unit 220 functions to select a phoneme string associated with a phoneme string of a speech signal, as a candidate, from a plurality of phoneme strings of vocabularies that are maintained in the dictionary. When extracting the candidates, the candidate extraction unit 220 calculates a similarity between a phoneme string of a vocabulary maintained in the dictionary and a phoneme string of a speech signal extracted as a result of phoneme recognition, and extracts the candidates based on the calculated similarity.

When comparing the similarity, with an assumption that a length of the phoneme string of the vocabulary maintained in the dictionary is different from a length of the phoneme string of the speech signal extracted as a result of phoneme recognition, the candidate extraction unit 220 performs a dynamic matching as necessary for determining a pair of phonemes for the similarity calculation between the pair of phonemes.

Namely, the dynamic matching may indicate a process of determining a particular phoneme of a vocabulary in a dictionary, which will be utilized for the similarity calculation, with respect to a phoneme of the phoneme string that is extracted by phoneme recognition. As an example, when a phoneme string of a speech signal is ⌈a0, a1, a2, a2', a3, a4⌋, and a phoneme string of a vocabulary is ⌈a0, a0', a1, a2, a2', a3⌋, the candidate extraction unit 220 may perform a dynamic matching with respect to ⌈a2⌋, a third phoneme in the phoneme string of the speech signal, and determine ⌈a1⌋, a third phoneme in the phoneme string of the vocabulary or ⌈a2⌋ having an identical shape, as a pair of phonemes for similarity comparison. Namely, the candidate extraction unit 220 may perform a dynamic matching with respect to ⌈a2⌋ and determine (a2, a1) and (a2, a2) as matching pairs.

Next, the candidate extraction unit 220 replaces the determined matching pair into a phoneme confusion matrix and calculates a similarity between the phoneme string of the vocabulary and the phoneme string of the speech signal. In this instance, the phoneme confusion matrix sets a distance as a numerical value according to a matching degree between phonemes included in the matching pair. As an example, the phoneme confusion matrix may set the distance to be decreased in proportion to the increase of the matching degree between phonemes.

The candidate extraction unit 220 obtains information about a distance between a phoneme string of a speech signal and a phoneme string of a predetermined vocabulary, by the phoneme confusion matrix. Also, based on the obtained distance information, the candidate extraction unit 220 may extract, as a candidate, the phoneme string of the vocabulary that has a higher similarity, i.e. that has a comparatively shorter distance from the speech signal, from the dictionary.

Figure 4:
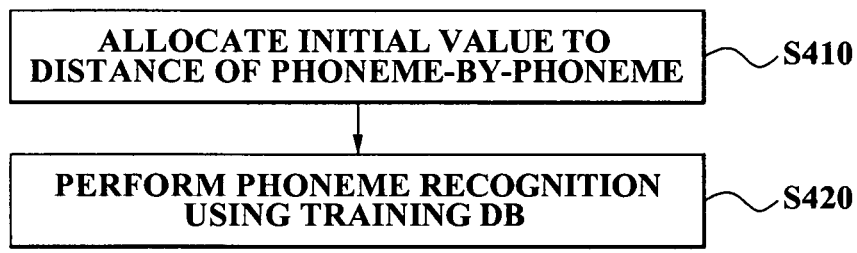
Figure 4:
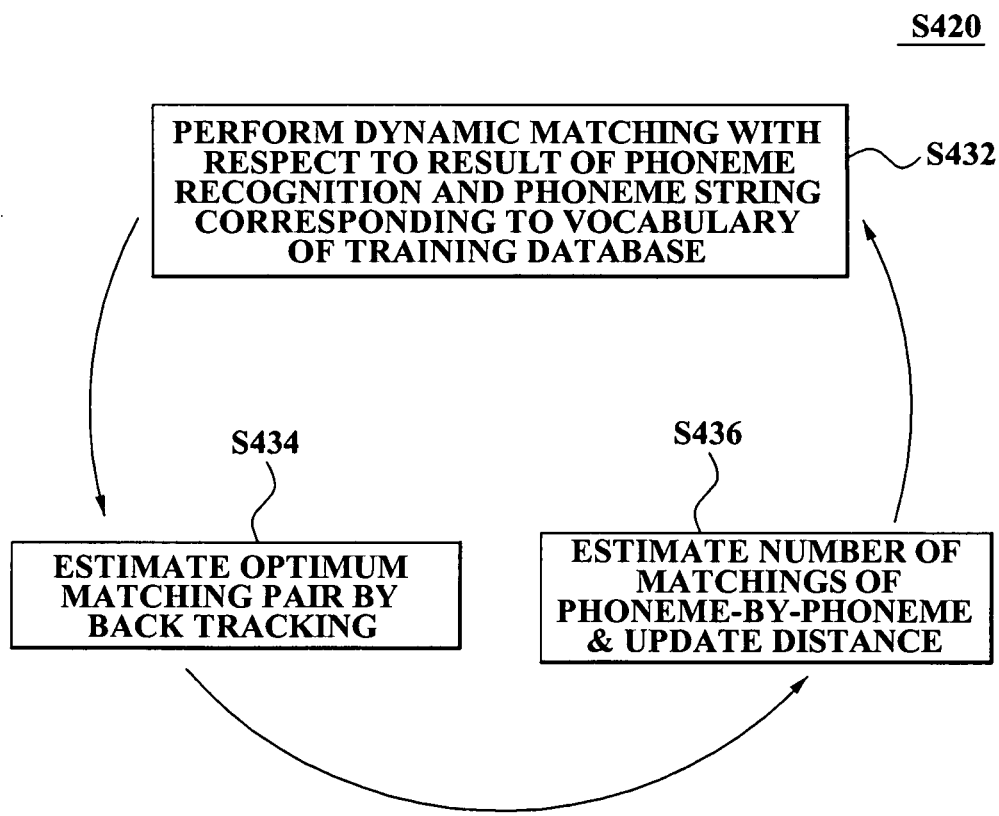

FIGS. 4 and 5 are flowcharts illustrating an example of estimating a phoneme confusion matrix according to an exemplary embodiment of the present invention.

As described above, a phoneme confusion matrix is utilized for determining a distance between two phonemes according to a matching degree. In this instance, the phoneme confusion matrix may be estimated by a designer of the present system or the recognition confidence measurement system 200. In the present exemplary embodiment, estimation of the phoneme confusion matrix by the recognition confidence measurement system 200 will be described.

As an example of estimating a phoneme confusion matrix, when setting a distance of the phoneme confusion matrix, more accurately setting a distance between phonemes through continuous updating and thereby estimating the phoneme confusion matrix will be described with reference to FIG. 4.

In operation S410, the recognition confidence measurement system 200 allocates an initial value to a distance of phoneme-by-phoneme similarity. Namely, in operation S410, the recognition confidence measurement system 200 assigns an initial value to a distance between two phonemes.

In operation S420, the recognition confidence measurement system 200 performs a phoneme recognition using a training database, and corrects the initial value to an accurate value. When correcting the initial value, the recognition confidence measurement system 200 may correct the initial value by utilizing a certain value that is converged by repeating operations S432 through S436, which will be described later.

In operation S432, the recognition confidence measurement system 200 performs a dynamic matching with respect to a result of phoneme recognition and a phoneme string corresponding to vocabularies of the training database.

In operation S434, the recognition confidence measurement system 200 estimates an optimum matching pair by back tracking and determines comparison phonemes for comparison from each phoneme string.

In operations S436, the recognition confidence measurement system 200 estimates a number of matchings of the phoneme-by-phoneme and updates the distance. Namely, in operation S436, the recognition confidence measurement system 200 calculates a distance with respect to a matching pair a plurality of number of times and conforms that a numerical value of the calculated distance is converged to a certain value. Next, the recognition confidence measurement system 200 may measure a distance setting of a phoneme confusion matrix by updating the initially set initial value to the converged certain value.

As another example of estimating a phoneme confusion matrix, setting a distance between phonemes by using an HMM and estimating a phoneme confusion matrix will be described with reference to FIG. 5.

In operation S510, the recognition confidence measurement system 200 estimates a continuous HMM or a semi-continuous HMM for each phoneme by using a training database.

In operation S520, the recognition confidence measurement system 200 estimates a distance of phoneme-by-phoneme according to properties of the estimated HMM in operation S520. Namely, in operation S520, when estimating the distance of phoneme-by-phoneme, the recognition confidence measurement system 200 may identify whether the estimated HMM is continuous HMM or semi-continuous HMM, and estimate the distance of phoneme-by-phoneme by using result information that is different according to property of the identified HMM.

When the property of the identified HMM in operation S510 is continuous HMM, the recognition confidence measurement system 200 may set a distance, i.e. similarity, of a phoneme-confusion-matrix by using a Bhattacharya distance as the distance of phoneme-by-phoneme in operation S522.

Also, when the property of the identified HMM is semi-continuous HMM, the recognition confidence measurement system 200 may estimate an amount of information loss and set a distance, i.e. similarity, of a phoneme-confusion-matrix by using the estimated amount of information loss.

The candidate extraction unit 220 may extract a plurality of phoneme strings of vocabularies that have a certain level of similarity with respect to a phoneme string of a speech signal, as candidates, through the phoneme confusion matrix estimated by the above-described method. As an example, when a phoneme string 's, a, m, s, u, n and g' is extracted with respect to a speech signal 'samsung', the candidate extraction unit 220 may extract phoneme strings 'samsung', 'samsong', 'sangsung', etc., which have a higher similarity to the extracted phoneme string, as candidates, from a dictionary.

When extracting a candidate, the candidate extraction unit 220 of the present invention may assign a predetermined weight to the distance and thus, more accurately calculate a distance. In the case of speech recognition, a discrimination degree between vocabularies may not be uniform with respect to all phonemes, i.e. phonemes of a phoneme string. Under such determinations, the candidate extraction unit 220 assigns a predetermined weight so that a different discrimination degree of ach phoneme may be reflected in calculation of the similarity.

Namely, the candidate extraction unit 220 may initially estimate a matching pair of phoneme-by-phoneme between candidates by using a training database (DB) as input of a speech recognizer and multiply a weight of each phoneme and a pre-setting and thus calculate a distance of the matching pair. As an example, the candidate extraction unit 220 may determine that more information is included in vowels rather than in consonants and assign a weight to a distance which is set in association with a matching pair of the vowels. Accordingly, the candidate extraction unit 220 may enable the distance which is set in association with the matching pair of the vowels to be more highly evaluated as information than a distance which is set in association with a matching pair of the consonants.

Also, the candidate extraction unit 220 may determine that a discrimination degree is different for each vowel and assign a different weight according to the each vowel. As an example, the candidate extraction unit 220 may determine that a diphthong has a higher discrimination degree than a single vowel. Accordingly, the candidate extraction unit 220 may set so that a weight to be assigned to a distance which is set in association with a matching pair of the diphthong is higher than a weight to be assigned to a distance which is set in association with a matching pair of the single vowel.

Estimation of an optimum weight using a steepest descent rule may be given by, $$J = \left[\frac{1}{N_{IV}}\sum_i f(x_i^{IV}) - \frac{1}{N_{OOV}}\sum_j f(x_j^{OOV})\right]^2 \quad \text{[Equation 1]}$$

$$f(x) = \frac{1}{1+\exp(-\tau(x-\beta))}$$

In this instance, $X_i^{IV}$ is a confidence score of an $i^{th}$ in-vocabulary (IV) utterance, $X_j^{OOV}$ is a confidence score of a $j^{th}$ out-of-vocabulary (OOV) utterance, and $N_{IV}$, $N_{OOV}$ is a number of IV/OOV utterances. The parameters alpha and beta in equation 1 determines the shape of the sigmoid function, whose general form is expressed by f(x) in equation 1. By applying a proper threshold to the outputs of the sigmoid function f(x), the decision result can be obtained by 0 or 1, and beta is closely related to the above thresholding value.

When a cost function J of Equation 1 is maximized, a weight with respect to each phoneme or phoneme-by-phoneme may be defined as, $$w_k(n+1) = w_k(n) + \mu E_T \kappa \quad \text{[Equation 2]}$$

$$E_T = \frac{1}{N_{IV}}\sum_i f(x_i^{IV}) - \frac{1}{N_{OOV}}\sum_j f(x_j^{OOV})$$

$$\kappa = \frac{1}{N_{IV}}\sum_i f(x_i'^{IV})(f(x_i'^{IV})-1)\left(-\tau\frac{\partial x_i^{IV}}{\partial w_k(n)}\right) -$$

$$\frac{1}{N_{OOV}}\sum_i f(x_i'^{OOV})(f(x_i'^{OOV})-1)\left(-\tau\frac{\partial x_i^{OOV}}{\partial w_k(n)}\right)$$

$$x' = -\tau(x-\beta)$$

In this instance, Equation 2 may be defined as an updating rule with respect to a k-th weight in a time n. The parameter mu controls the adaptation speed for gradient-based optimal weight search. The variables ET and Kappa are just rewritings of complicated terms, as shown in equation 2, to make the weight ($w_k$) look neat and be understood easily.

In Equations 1 and 2, an initial value may be set as 1.

Also, since a cost function J is a function that has a large correlation with an equal error rate (EER), the cost function J may utilize a weight corresponding to a sufficiently converged value, as an optimum value.

The distance estimation unit 230 estimates a lexical distance between the extracted candidates. Namely, the distance estimation unit 230 performs a dynamic matching with respect to a plurality of phoneme strings, i.e. a pair of candidates, among phoneme strings of vocabularies extracted as candidates, and calculates a score for the pair of candidates. Also, the distance estimation unit 230 estimates the lexical distance using the calculated score of the pair of candidates.

The distance estimation unit 230 may perform a dynamic matching which is similar or identical to a dynamic matching performed by the candidate extraction unit 220. In this instance, in the case of the dynamic matching of the distance estimation unit 230, the distance estimation unit 230 utilizes not a phoneme string of a speech signal detected by speech recognition, but only a phoneme string of a vocabulary extracted as a candidate to estimate a distance between candidates. Namely, the distance estimation unit 230 calculates a score with respect to a pair of candidates by using a phoneme confusion matrix.

The registration determination unit 240 determines whether an input speech signal is an in-vocabulary based on the lexical distance. Namely, when the calculated score satisfies a set numerical value, the registration determination unit 240 determines the input speech signal as an in-vocabulary. In this instance, the registration determination unit 240 may suggest only the pair of candidates determined as the in-vocabulary and thus, improve user convenience in a speech recognition process.

Also, when the calculated score does not satisfy the set numerical value, the registration determination unit 240 determines the input speech signal as an out-of-vocabulary. During the determination process, the registration determination unit 240 performs a rejection due to a recognition error with respect to the input speech signal that is determined as the out-of-vocabulary.

Namely, the recognition confidence measurement system 200 according to the present exemplary embodiment may suggest a smaller number of candidates to be detected and also improve user convenience by clearly performing a rejection due to a recognition error.

Also, when determining whether an input speech signal is an in-vocabulary, the registration determination unit 240 may assign a predetermined weight to a calculated score of a pair of candidates and more accurately estimate a distance between the candidates.

When an optimum phoneme matching pair is detected according to dynamic matching of the registration determination unit 240, a score of a pair of candidates may be calculated by, $$x_i = \sum_{n=0}^{L_{x1}-1} PCM(PHONE_n^{1st-Cand}, PHONE_n^{2st-Cand}) \quad \text{[Equation 3]}$$

$$PCM : \text{phone confusion matrix}$$

As described above, an initial score $x_i$ of a pair of candidates may be calculated by using a phoneme confusion matrix (PCM).

Next, the registration determination unit 240 may apply a weight to the calculated score and output a corrected score as given by, $$x_i' = \sum_{n=0}^{L_{x1}-1} W(PHONE_n^{1st-Cand}, PHONE_n^{2st-Cand}) * \quad \text{[Equation 4]}$$

$$PCM(PHONE_n^{1st-Cand}, PHONE_n^{2st-Cand})$$

$$W(PHONE_n^{1st-Cand}, PHONE_n^{2st-Cand})$$

In Equation 4, W may be defined as an optimum weight value between matched phonemes.

According to the above-described exemplary embodiments of the present invention, a lexical distance between candidates may be more accurately estimated through score correction. Also, whether a speech signal is an in-vocabulary or an out-of-vocabulary may be more clearly determined.

Hereinafter, operation flow of a recognition confidence measurement system using a lexical distance between candidates according to another exemplary embodiment of the present invention will be described in detail.

Figure 6:
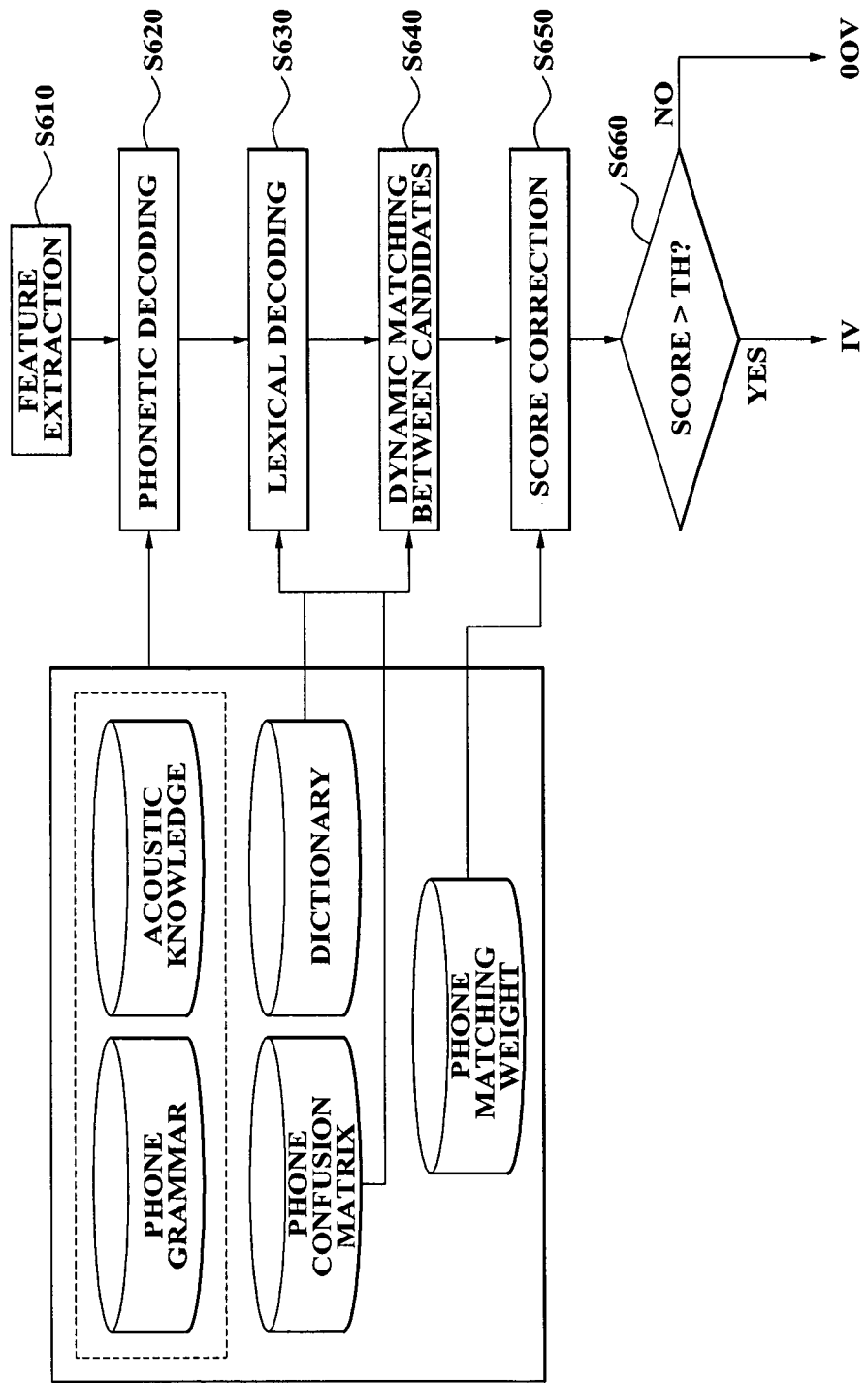
FIG. 6 is a flowchart illustrating a recognition confidence measurement method according to another exemplary embodiment of the present invention.

FIG. 6 is a flowchart illustrating a recognition confidence measurement method according to another exemplary embodiment of the present invention.

The recognition confidence measurement method according to the present exemplary embodiment may be performed by the above-described recognition confidence measurement system 200.

In operation S610, the recognition confidence measurement system 200 extracts a feature vector of a speech signal. Namely, operation S610 is a process of detecting a feature vector of an input speech signal. In operation S610, the recognition confidence measurement system 200 may detect a 39 order cepstrum including feature information of an input speech signal by using an FFT.

In operation S620, the recognition confidence measurement system 200 extracts a phoneme string using the extracted feature vector of the speech signal. Operation S620 is a phonetic decoding process of extracting a phoneme string from a feature vector of an input speech signal. As an example, in operation S620, the recognition confidence measurement system 200 may extract a phoneme string by changing a feature vector into a scalar value and specifying a phoneme associated with pronunciation of a speech signal. In operation S620, the recognition confidence measurement system 200 may extract an optimum phoneme string according to each language by using an HMM, acoustic knowledge and a predetermined phoneme grammar for the each language.

In operation S630, the recognition confidence measurement system 200 extracts candidates by matching an extracted phoneme string and phoneme strings of vocabularies registered in a predetermined dictionary. Operation S630 is a lexical decoding process of calculating a similarity between an extracted phoneme string and phoneme strings of vocabularies and extracting a phoneme string of a vocabulary from a dictionary based on the calculated similarity. When calculating the similarity, the recognition confidence measurement system 200 performs a dynamic matching with respect to a phoneme string of a speech signal and phoneme strings of vocabularies and determines a pair of phonemes to be matched, i.e. a matching pair. Also, the recognition confidence measurement system 200 replaces the determined pair of phonemes, i.e. the matching pair, in a phoneme confusion matrix and estimates a distance between the phoneme string of the speech signal and phoneme strings of vocabularies and thus, determines the distance.

In operation S640, the recognition confidence measurement system 200 estimates a lexical distance between the extracted candidates. Operation S640 is a process of selecting a pair of candidates from the extracted candidates and performing a dynamic matching with respect to the selected pair of candidates. As an example, the recognition confidence measurement system 200 selects phoneme strings, which have a highest level of similarity to a speech signal and a phoneme string that has a second highest level of similarity, from phoneme strings of vocabularies that are extracted as candidates, and determines a phoneme matching pair to be compared through dynamic matching of the selected two phoneme strings. Next, the recognition confidence measurement system 200 replaces the determined phoneme matching pair into the phoneme confusion matrix, calculates a score for the two candidates and estimates a lexical distance between the two candidates using the calculated score.

In operation S650, the recognition confidence measurement system 200 reflects a predetermined weight to the calculated score and corrects the score. Operation S650 is a process of correcting a previously calculated score so as to more accurately calculate the distance between candidates. As an example, the recognition confidence measurement system 200 may recalculate a score by multiplying a phoneme matching weight, shown in Equation 4, and each phoneme, based on a discrimination degree between phonemes.

In operation S660, the recognition confidence measurement system 200 determines whether an input speech signal is an in-vocabulary, based on the lexical distance. Operation S660 is a process of determining whether a speech signal is an in-vocabulary or an out-of-vocabulary by using the calculated score, i.e. a process of determining whether a vocabulary associated with a speech signal is in a dictionary.

Namely, in operation S660, when the calculated score satisfies a set numerical value, i.e. a yes direction in operation S660, the recognition confidence measurement system 200 determines an input speech signal as an in-vocabulary. On the contrary, when the calculated score does not satisfy the set numerical value, i.e. a no direction in operation S660, the recognition confidence measurement system 200 determines the input speech signal as an out-of-vocabulary. Through this process, the recognition confidence measurement system 200 may clearly perform a rejection due to a recognition error with respect to the input speech signal that is determined as the out-of-vocabulary.

According to the above-described exemplary embodiments of the present invention, the recognition confidence measurement method may search for a vocabulary using a phoneme string that is extracted from an input speech signal and a phoneme confusion matrix. Also, the recognition confidence measurement method may clearly perform a rejection due to a recognition error by estimating the lexical distance between candidates and reduce a number of candidates.

Figure 7:
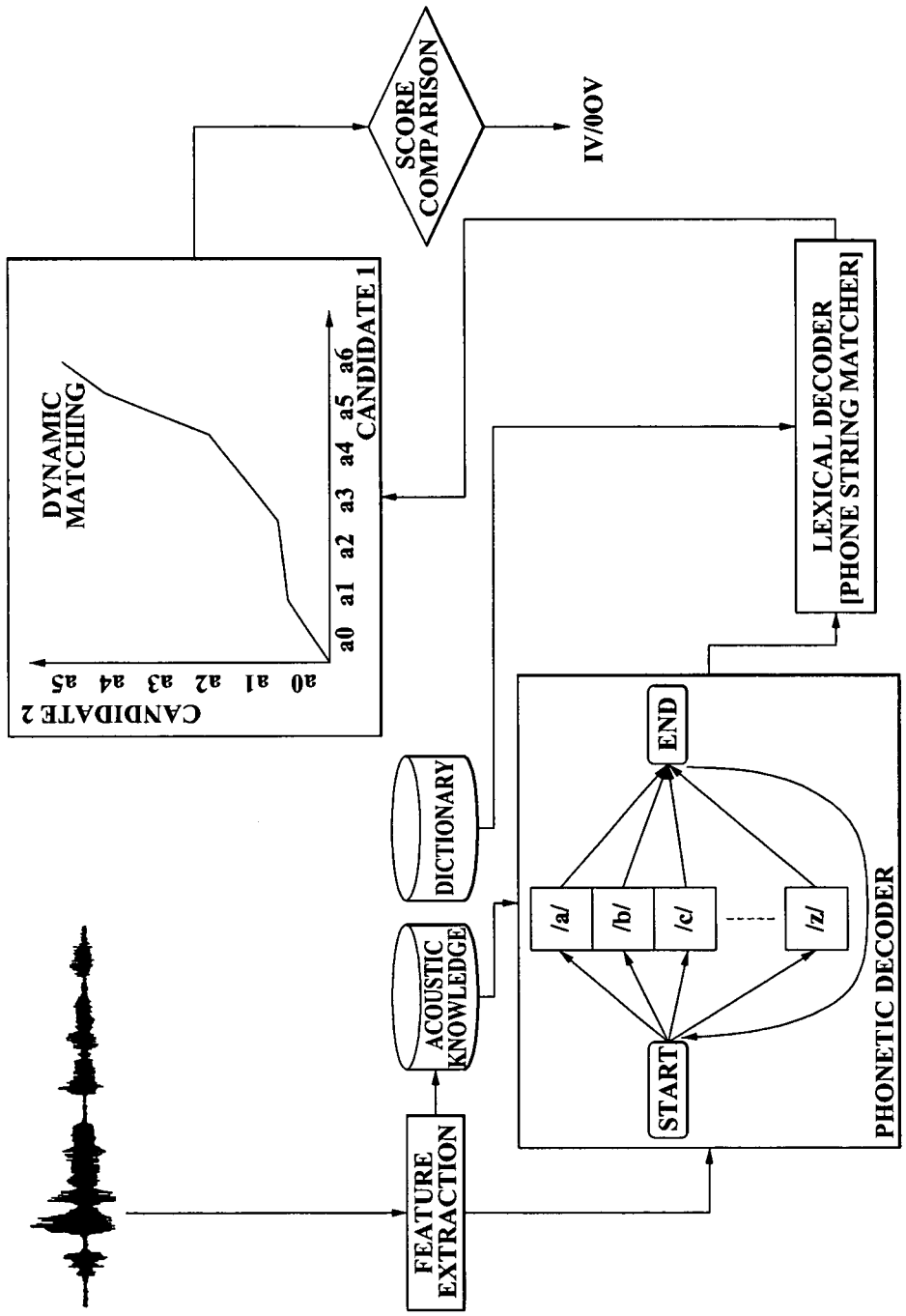
FIG. 7 is a schematic diagram illustrating an example of a recognition confidence measurement method according to still another exemplary embodiment of the present invention.

FIG. 7 is a schematic diagram illustrating an example of a recognition confidence measurement method according to still another exemplary embodiment of the present invention.

Initially, the recognition confidence measurement system 200 extracts a feature vector from an input speech signal and extracts a phoneme string of a speech signal from a phonetic decoder by referring to the extracted feature vector and acoustic knowledge. FIG. 7 illustrates an example of extracting a predetermined alphabet from a feature vector of an input speech signal.

Next, the recognition confidence measurement system 200 searches a dictionary for phoneme strings of vocabularies that match an extracted phoneme string and thus, extracts the found phoneme strings as candidates. Such candidates may be extracted by comparing a similarity between a phoneme string of a speech signal and phoneme strings of vocabularies in, a lexical decoder. The similarity comparison may be performed by using a phoneme confusion matrix. In this instance, the phoneme confusion matrix estimates the lexical distance between the matching pair which is determined by dynamic matching, i.e. a pair between a predetermined phoneme of a speech signal and predetermined phonemes of vocabularies. The recognition confidence measurement system 200 may extract phoneme strings of vocabularies that have a certain level of similarity to a phoneme string of a speech signal, as candidates.

Also, the recognition confidence measurement system 200 determines a phoneme matching pair through dynamic matching of two selected candidates which are selected from the extracted candidates. Namely, the recognition confidence measurement system 200 selects a candidate that has a highest level of similarity and a candidate that has a second highest level of similarity and performs optimum dynamic matching for phonemes of the selected two candidates.

Also, the recognition confidence measurement system 200 replaces a phoneme matching pair, which is determined by the dynamic matching, into a phoneme confusion matrix, calculates a score of a lexical distance between candidates, and determines the input speech signal as an in-vocabulary or an out-of-vocabulary depending upon whether the calculated score satisfies a predetermined set numerical value.

Namely, according to the above-described exemplary embodiments of the present invention, the recognition confidence measurement method may reduce a number of candidates to be extracted in association with an input speech signal and also clearly perform a rejection due to a recognition error with respect to an out-of-vocabulary by estimating the lexical distance between the candidates.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of program instructions include both machine code, such as produced by a compiler, and files containing higher level code that may be executed by a computing device and the like using an interpreter.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, or DVDs), magneto-optical media (e.g., floptical disks), and hardware storage devices (e.g., read only memory media, random access memory media, flash memories, etc.). The medium/media may also be a distributed network, so that the computer readable code/instructions is stored and executed in a distributed fashion. The computer readable code/instructions may be executed by one or more processors. In addition, the above hardware devices may be configured to act as one or more software modules in order to perform the operations of the above-described exemplary embodiments.

According to the above-described exemplary embodiments of the present invention, there is provided a recognition confidence measurement method and system which can extract a candidate for speech recognition by using a phoneme string that is detected from a feature vector of an input speech signal.

According to the above-described exemplary embodiments of the present invention, there is provided a recognition confidence measurement method and system which can provide a minimum number of candidates and improve user convenience by extracting a phoneme string of a vocabulary that has an optimum lexical distance from a phoneme string of a speech signal by using a phoneme confusion matrix.

According to the above-described exemplary embodiments of the present invention, there is provided a recognition confidence measurement method and system which can more clearly determine whether an input speech signal is an in-vocabulary and perform a rejection due to a recognition error by estimating a lexical distance between candidates.

According to the above-described exemplary embodiments of the present invention, when evaluating a classification error of in-vocabulary and/or out-of-vocabulary in speech recognition of 10,000 words, a recognition confidence measurement method can perform speech recognition at a comparatively lower EER, e.g. 26.7%, in comparison with an EER of 30.6% of the conventional acoustic difference score method and an EER of 28.5% of the conventional monophony filler network based method.

According to the above-described exemplary embodiments of the present invention, a recognition confidence measurement method may be applicable when the latest phoneme string based large-capacity speech recognition or the conventional speech recognition method recognizes a phoneme string of a vocabulary. Also, the recognition confidence measurement method is not limited to a particular language and may be utilized in any type of languages.

According to the above-described exemplary embodiments of the present invention, a recognition confidence measurement method is not limited to only speech recognition and may be applicable to any type of speech recognition, e.g. a name of person, a name of place, a number sound, a point of interest (POI), etc.

According to the above-described exemplary embodiments of the present invention, a recognition confidence measurement method may rapidly estimate a lexical distance between candidates before lexical decoding. Accordingly, the recognition confidence measurement method may significantly reduce a number of candidates and consumption of hardware resources, rather than detailed searching by an acoustic model after lexical decoding in the conventional art.

Although a few exemplary embodiments of the present invention have been shown and described, the present invention is not limited to the described embodiments. Instead, it would be appreciated by those skilled in the art that changes may be made to these exemplary embodiments without departing from the principles and spirit of the invention, the scope of which is defined by the claims and their equivalents.

What is claimed is:

1. A recognition confidence measurement method comprising:
    detecting a feature vector of an input speech signal through normalization of a histogram and extracting a phoneme string from the detected feature vector of the input speech signal;
    obtaining information about a distance between a phoneme string of the input speech signal and a phoneme string of a predetermined vocabulary, by a predetermined phoneme confusion matrix, wherein the phoneme confusion matrix sets the distance to be decreased in proportion to the increase of the matching degree between phonemes;
    extracting as candidates, the phoneme string of the vocabulary that has a higher similarity which denotes a comparatively shorter distance from the speech signal, from a predetermined dictionary;
    estimating a lexical distance between the extracted candidates, the estimating of the lexical distance comprising selecting a pair of candidates from the extracted candidates and performing a dynamic matching of the selected pair of candidates; and
    determining whether the input speech signal is an in-vocabulary, based on the lexical distance, wherein the dynamic matching comprises:
    for each phoneme in a first candidate of the selected pair of candidates, determining as a first matching pair the phoneme in the first candidate and the corresponding phoneme in a second candidate of the selected pair of candidates and determining as a second matching pair the phoneme in the first candidate and a phoneme having an identical shape to the phoneme in the first candidate;
    wherein the estimating of the lexical distance further comprises:
    calculating a score for the pair of candidates; and
    estimating the lexical distance using the calculated score;
    wherein the calculating of the score calculates the score using the phoneme confusion matrix.

2. The method of claim 1, wherein the extracting of the phoneme string extracts an optimum phoneme string according to each language by using a Hidden Markov Model (HMM) and a predetermined phoneme grammar for each language.

3. The method of claim 1, wherein estimating the phoneme confusion matrix comprises:
    allocating an initial value to a distance of phoneme-by-phoneme; and
    performing a phoneme recognition using a training database.

4. The method of claim 3, wherein the performing of the phoneme recognition comprises:
    performing a dynamic matching with respect to a result of the phoneme recognition and a phoneme string corresponding to vocabularies of the training database;
    estimating an optimum matching pair by back tracking; and
    estimating a number of matchings of the phoneme-by-phoneme and updating the distance.

5. The method of claim 1, wherein estimating the phoneme confusion matrix comprises:
    estimating a continuous HMM or a semi-continuous HMM for each phoneme by using a training database; and
    estimating a distance of phoneme-by-phoneme.

6. The method of claim 5, wherein the estimating of the distance comprises:
    utilizing a Bhattacharya distance, in the case of the continuous HMM; and
    estimating an amount of information loss, in the case of the semi-continuous HMM.

7. The method of claim 1, wherein the determining whether the input speech signal is in-vocabulary comprises:
    determining the input speech signal as in-vocabulary, when the calculated score satisfies a set numerical value; and
    determining the input speech signal as an out-of-vocabulary, when the calculated score does not satisfy the set numerical value.

8. The method of claim 1, wherein the determining whether the input speech signal is in-vocabulary comprises:
    utilizing a predetermined weight for the calculated score to correct the calculated score.

9. The method of claim 7, wherein the determining the input speech signal as out-of-vocabulary comprises:
    performing a rejection due to a recognition error with respect to the input speech signal.

10. A non-transitory computer readable storage medium storing a program for implementing a recognition confidence measurement method comprising:
    detecting a feature vector of an input speech signal through normalization of a histogram and extracting a phoneme string from the feature vector of the input speech signal;
    obtaining information about a distance between a phoneme string of the input speech signal and a phoneme string of a predetermined vocabulary, by a predetermined phoneme confusion matrix which sets the distance to be decreased in proportion to the increase of a matching degree between phonemes;
    extracting as candidates, the phoneme string of the vocabulary that has a higher similarity and that has a comparatively shorter distance from the speech signal, from a predetermined dictionary;
    estimating a lexical distance between the extracted candidates, the estimating of the lexical distance comprising performing a dynamic matching of a pair of candidates selected from the extracted candidates; and
    determining whether the input speech signal is an in-vocabulary, based on the lexical distance, wherein the dynamic matching comprises:
    for each phoneme in a first candidate of the selected pair of candidates, determining as a first matching pair the phoneme in the first candidate and the corresponding phoneme in a second candidate of the selected pair of candidates and determining as a second matching pair the phoneme in the first candidate and a phoneme having an identical shape to the phoneme in the first candidate;
    wherein the estimating of the lexical distance further comprises:
    calculating a score for the pair of candidates; and
    estimating the lexical distance using the calculated score;
    wherein the calculating of the score calculates the score using the phoneme confusion matrix.

11. A recognition confidence measurement system comprising:
    at least one processor to control one or more of the following units;
    a phoneme string extraction unit detecting a feature vector of an input speech signal through normalization of a histogram and extracting a phoneme string from the feature vector of the input speech signal;

a candidate extraction unit obtaining information about a distance between a phoneme string of the input speech signal and a phoneme string of a predetermined vocabulary, by a predetermined phoneme confusion matrix which sets the distance to be decreased in proportion to the increase of a matching degree between phonemes, extracting as candidates the phoneme string of the vocabulary that has a higher similarity and that has a comparatively shorter distance from the speech signal, from a predetermined dictionary;

a distance estimation unit estimating a lexical distance between the extracted candidates, the estimating of the lexical distance comprising performing a dynamic matching of a pair of candidates selected from the extracted candidates; and a registration determination unit determining whether the input speech signal is an in-vocabulary, based on the lexical distance, wherein the dynamic matching comprises:

for each phoneme in a first candidate of the selected pair of candidates, determining as a first matching pair the phoneme in the first candidate and the corresponding phoneme in a second candidate of the selected pair of candidates and determining as a second matching pair the phoneme in the first candidate and a phoneme having an identical shape to the phoneme in the first candidate;

wherein the estimating of the lexical distance further comprises:

calculating a score for the pair of candidates; and estimating the lexical distance using the calculated score;

wherein the calculating of the score calculates the score using the phoneme confusion matrix.

12. The system of claim 11, wherein the phoneme string extraction unit extracts an optimum phoneme string according to each language by using a Hidden Markov Model (HMM) and a predetermined phoneme grammar for the each language.

13. The system of claim 11, wherein the registration determination unit determines the input speech signal as in-vocabulary, when the calculated score satisfies a set numerical value and determines the input speech signal as an out-of-vocabulary, when the calculated score does not satisfy the set numerical value.

14. The system of claim 11, wherein the registration determination unit utilizes a predetermined weight for the calculated score to correct the calculated score.

15. The system of claim 11, wherein the registration determination unit performs a rejection due to a recognition error with respect to the input speech signal.

16. A recognition confidence measurement method comprising:

extracting candidates by matching a phoneme string of a speech signal, extracted by a feature vector which is detected from the speech signal through normalization of a histogram, and phoneme strings of vocabularies registered in a predetermined dictionary;

obtaining information about a distance between a phoneme string of the input speech signal and a phoneme string of a predetermined vocabulary, by a predetermined phoneme confusion matrix which sets the distance to be decreased in proportion to the increase of a matching degree between phonemes;

extracting as candidates, the phoneme string of the vocabulary that has a higher similarity and that has a comparatively shorter distance from the speech signal, from a predetermined dictionary;

estimating a lexical distance between the extracted candidates, the estimating of the lexical distance comprising performing a dynamic matching of a pair of candidates selected from the extracted candidates; and determining whether the speech signal is an in-vocabulary, based on the lexical distance, wherein the dynamic matching comprises:

for each phoneme in a first candidate of the selected pair of candidates, determining as a first matching pair the phoneme in the first candidate and the corresponding phoneme in a second candidate of the selected pair of candidates and determining as a second matching pair the phoneme in the first candidate and a phoneme having an identical shape to the phoneme in the first candidate;

wherein the estimating of the lexical distance further comprises:

calculating a score for the pair of candidates; and estimating the lexical distance using the calculated score;

wherein the calculating of the score calculates the score using the phoneme confusion matrix.

17. A non-transitory medium comprising computer readable instructions implementing the method of claim 16.

* * * * *